Aug. 10, 1954  C. E. EVES  2,685,721
RESILIENT STUD FASTENER
Filed Oct. 25, 1952
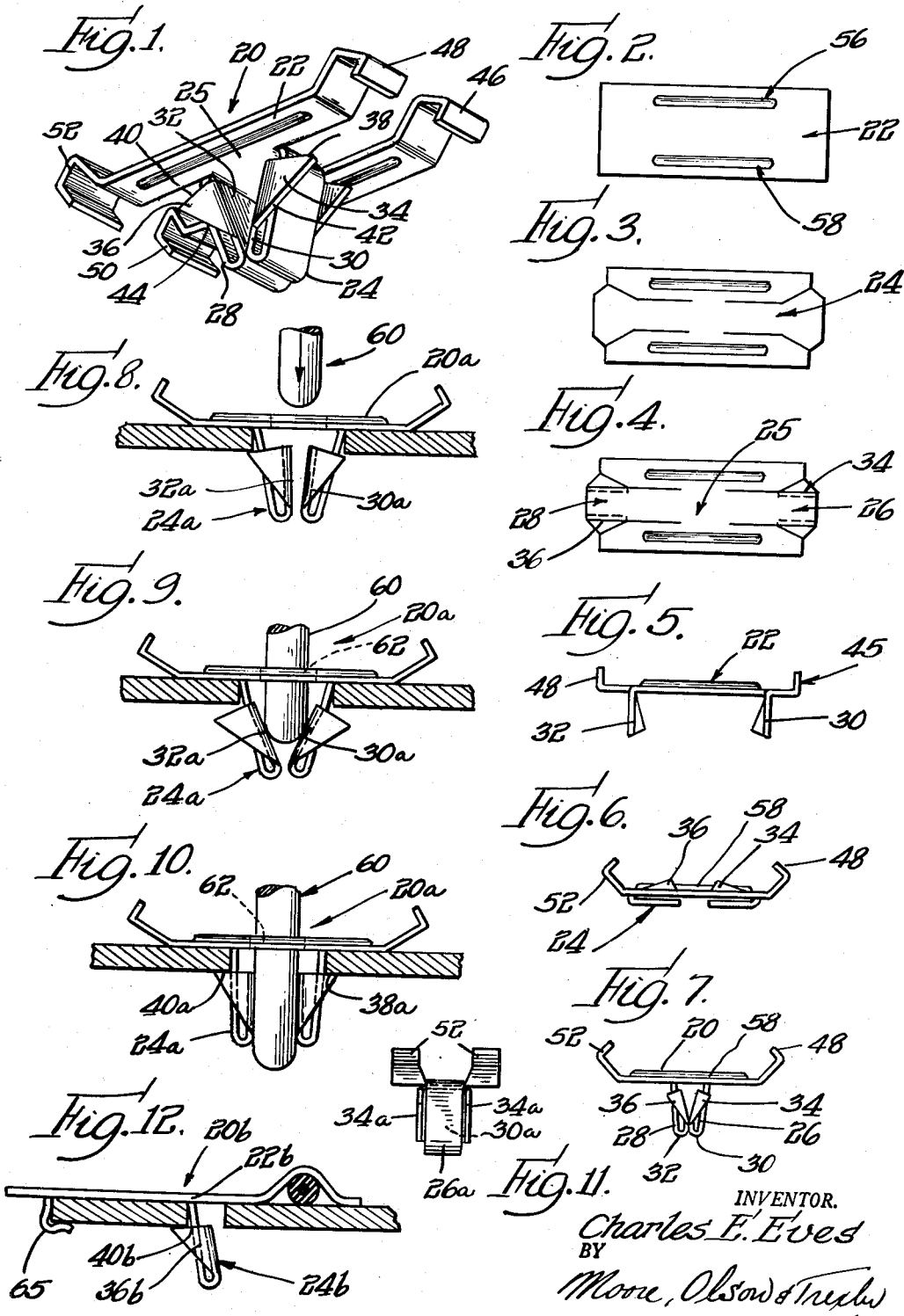
INVENTOR.
Charles E. Eves
BY
Moore, Olson & Trexler
attys.

Patented Aug. 10, 1954

2,685,721

UNITED STATES PATENT OFFICE 2,685,721

RESILIENT STUD FASTENER

Charles E. Eves, Bensenville, Ill., assignor to Illinois Tool Works, Chicago, Ill., a corporation of Illinois Application October 25, 1952, Serial No. 316,917

4 Claims. (Cl. 24—73)

This invention relates to a sheet metal fastener, and more particularly to a fastener designed to secure objects to apertured panels or supports.

There are many types of sheet metal fastener devices that have been designed to secure objects to apertured supports, but it has been observed by me that the great majority of these fasteners are provided with stud portions that carry their fastening means on the stud arms for purposes of engaging the undersurface of the apertured panel on which they are mounted. In many cases, this causes the surface of the stud arms to be spaced from the wall of the aperture or hole into which they are inserted.

Furthermore, the resilience of fasteners of the type that have the means for engaging the undersurface of the apertured panel on the stud arms, is dependent on only one factor, the resilience of the stud arm. This is not an ideal situation because shear stresses operating on either the fastener head on top of the work piece, or on the means for engaging the undersurface of the work piece, will tend to loosen the fastener.

It is one of the primary objects of this invention to provide means for engaging the undersurface of the work piece or panel which operate substantially independent of the stud arms.

Another object of this invention is to provide a sheet metal fastener that has a stud portion or arm specifically designed to engage the wall of the aperture into which it is inserted.

It is still another important object of the invention to provide a fastener device having a construction that permits it to withstand considerable shear stress applied in any direction relative to the stud without effect on the retaining means which operate independently of the stud arms of the fastener.

It is still another object of the invention to provide a sheet metal fastener device which may be readily removed from the aperture of the panel on which it is mounted without the use of special tools, is reusable indefinitely, and at the same time leaving the holding ability of the retaining means unaffected.

Another object of the invention is to provide a fastener whose stud portion is designed in conjunction with the head of the fastener to substantially seal the hole in which it is mounted.

Still a further object of the invention is to provide a sheet metal fastener having a head element which may be used to mount objects on a support, and which head element operates independently of the previously described stud portion and retaining means thereon.

These and other objects of the invention will be more fully understood by persons skilled in the art upon reference to the following description and to the accompanying drawings wherein:

Fig. 1 is a perspective view of one embodiment of the fastener disclosed in the form of a moulding clip.

Figs. 2 to 7 inclusive show the blank for, and the method used in the producing of the fastener device shown in Fig. 1.

Figs. 8 to 10 inclusive show a second embodiment of the fastener that is not heat treated and which is permanently deformed to accomplish its mounting on an apertured panel.

Fig. 11 is an end view of the fastener device shown in Fig. 8 and made in accordance with the invention wherein double retaining means are provided to ensure positive engagement of the undersurface of the panel.

Fig. 12 shows still another form of the fastener contemplated by the invention incorporating the novel stud portion shown in previous embodiments and contemplated by this invention.

Referring to the drawings more in detail, wherein like numerals have been employed to designate similar parts throughout the various figures, it will be seen that the present invention contemplates a one-piece sheet metal fastener for securing objects to an apertured panel and is designated generally by the numeral 20. Sheet metal fastener 20 is comprised of a head 22 and a stud 24 which depends from a bridge or bight portion 25 that functions as a part of the head. The stud is comprised of opposed arms 26 and 28 and which are adapted to engage the walls of the aperture as is clearly illustrated in Figs. 8 to 10 inclusive. The free ends 30 and 32 of the arms 26 and 28 respectively, are folded back upon the intermediate portion of the arms and are spaced relative to each other to permit independent movement during the mounting of the fastener in an apertured panel, as will be hereinafter described.

Lugs are formed, preferably, from side margins of the free ends of the arms 30 and 32 or tabs 34 and 36, which lugs extend laterally outwardly relative to the arms from which they extend, and further, traverse the plane of the outer arm portions 26 and 28. These tabs or lugs are provided with surfaces 38 and 40 adapted to engage the undersurface of the apertured panel into which the stud is inserted. These surfaces 38 and 40 are preferably formed to lie in planes angularly disposed relative to the plane of the head of the fastener, said planes diverging from the stud axis, as well as the plane of the head, in an outwardly direction. By this arrangement the tabs or lugs will accommodate panels of various thicknesses, and also will grippingly or clampingly engage any panel which is mounted between the head and the presently described edge portions 38 and 40 of the tab. The other side margins of these tabs are formed preferably to diverge relative to each other in a direction away from the entering end portion of the stud thereby providing cam surfaces, which cam surfaces act to temporarily deflect inwardly the lugs 34 and 36 as the stud of the fastener is moved axially relative to the panel aperture in which the fastener is to be mounted. It is obvious that after the lug portions 34 and 36 move to a position axially beyond the top of the cam surfaces 42 and 44 the lug portions 34 and 36 are permitted to return to their normal or unflexed position positively underlying the bottom surfaces of the panel and coacting with the head to clampingly engage the panel therebetween. It will be noted that the embodiment shown in Fig. 1 is of a type which is preferably heat treated in order to afford the necessary resilience. Other forms of the fastener contemplated by this invention may be left in the unheat-treated form, as will be later described.

Obviously, any form of head may be provided on the fastener, but for purposes of illustration in Figs. 1 through 11 a head 22 has been provided of a type adapted to be used to engage the inturned flanges of a moulding clip. Members 46, 48, 50 and 52 are spaced a distance greater than the distance between the inner margins of the inturned flanges of a companion moulding, and by reason of their resilient character, a moulding can be snapped over the members 46, 48, 50 and 52 and be retained rigidly thereby. Elements to retain cables, conduits and the like in mounted position relative to the panel could obviously be provided (such as is shown in Fig. 12), but for purposes of this application, applicant deems it unnecessary to show a multiplicity of all the various elements which might be useful.

Figs. 2 to 7 inclusive show the various steps contemplated to be taken in the manufacture of this device. It is of particular interest that the device is made from a blank with substantially no scrap which, of course, is of primary importance if this device is to be produced economically.

Fig. 2 shows the blank with ribbed portions 56 and 58. These ribs add rigidity to the head member 22. In Fig. 3 cuts have been made to provide the stud portion 24 previously described. In Fig. 4 is shown the lugs 34 and 36 turned downwardly relative to the arms 26 and 28 respectively. In Fig. 5 the free end portions 30 and 32 of the arms 26 and 28 have been formed downwardly and the moulding engaging portions 46 and 48 preliminarily formed. Figs. 6 and 7 show the folding operations necessary to complete the stud portion 24 and the moulding engaging portions to their final form.

Figs. 8 to 10 inclusive show a fastener having the same stud structure and other features of the embodiment shown in Fig. 1, with the exception that this fastener is made of a material which is not heat treated. It will be noted that after the clip has been mounted upon the panel, a stud or anvil portion 60 is pushed downwardly through an aperture 62 in the head which permanently spreads outwardly the free end portions 30a and 32a of the stud 24a. Once the end portions 30a and 32a are so spread, the lug portions 38a and 40a will coact with the head of the fastener to clampingly engage the work piece therebetween. It is desirable to afford a deformable type clip of this type, for the reason that elimination of the heat treating step assures a more economical product, and because in many instances a snap fastener of the type shown in Fig. 1 is undesirable if the surface of the apertured panel into which it is to be mounted is of such a nature that chipping or nicking of the surface of the aperture wall will expose the surface to rusting, etc. An example of the above, to be specific, would be the mounting of a clip on an enameled wall of a refrigerator where it is necessary to avoid any chipping of the enameled surface in order to avoid exposure of the surface which would cause rusting or corrosion.

Fig. 11 is an end view of the fastener shown in Fig. 8, showing the plurality of tabs 34a on the free end of the arm portion 38a. By providing two lug portions per arm, a more substantial clamping of the fastener is obtained than would be possible were only one lug portion provided.

In Fig. 12, still another embodiment of the fastener is shown for the purpose of disclosing the various possibilities which a stud of the type contemplated by this invention affords. It should be noted that the fastener 20b shown in Fig. 12 is comprised of a head 22b with an L or hook shaped arm 65 depending therefrom, and spaced from a stud element 24b with which it cooperates to secure the fastener on an apertured panel. This type of fastener is particularly useful where it is desired to secure an object near an edge margin of an apertured panel, the L-shaped element 65 hooking over the edge of the panel to embrace opposed surfaces of the panel while the stud is inserted into an aperture with the lug element 36b and its edge 40b engaging the bottom surface of the panel at a point removed from the engaging arm of the element 65. Obviously, the head portion of the fastener can take any form desired, but for purposes of illustration I have shown the head of the fastener formed to retain a conduit or conductor in mounted position on a panel. This form of fastener eliminates the necessity of providing a square hole within the peripheral margins of a work piece to retain the fastener against rotation. The element 65 cooperating with the stud assures positive positioning of the clip relative to the panel. While I have shown several embodiments of the invention for purposes of disclosure, it should be clearly understood that I do not intend the descriptive material to in any way be construed as a limitation to the scope of the invention contemplated herein, but rather intend that I shall be limited only by the scope of the following claims.

The invention is hereby claimed as follows:

1. A one-piece fastener device for mounting on an apertured panel including a head, and a stud having an arm which depends from said head and is adapted to extend through an aperture of the panel, said depending arm having a reversely bent portion formed from the free end of said arm and extending toward said head, and a lug element extending laterally from the reversely bent portion of said arm at each side margin thereof and traversing and projecting laterally beyond the plane of said depending arm whereby to present shoulders for cooperating with said head to grippingly engage the opposed surfaces of a panel therebetween.

2. A fastener as set forth in claim 1 wherein said lug elements are provided with sloping marginal portions which diverge outwardly from the stud axis toward the head of the fastener to provide cam surfaces thereby facilitating the mounting of the fastener in an apertured work piece.

3. A one-piece fastener device for use in attaching objects to an apertured panel including a head, and a stud comprised of a pair of arm portions depending from said head and adapted to extend through an aperture of the panel, said arms having reversely bent portions formed from the free ends thereof and extending toward said head, and lug elements extending laterally from the reversely bent free end portion of each arm at longitudinal margins thereof, each of said lug elements traversing and projecting laterally beyond the depending portions of said arms to form shoulders, said shoulders having marginal portions thereof oppositely disposed from and spaced axially from the head and diverging relative to said head in a direction outwardly from the stud axis and adapted to coact with said head to clampingly engage opposed surfaces of a panel when mounted thereon.

4. A fastener of the type set forth in claim 3 wherein the head of the fastener is provided with an aperture intermediate said pair of depending arm portions to permit insertion of a tool to spread apart said arm portions to ensure adequate engagement of said shoulders with the undersurface of the work panel.

References Cited in the file of this patent

UNITED STATES PATENTS

| Number | Name | Date |
|---|---|---|
| 1,976,889 | Place | Oct. 16, 1934 |
| 2,178,719 | Cotter | Nov. 7, 1939 |
| 2,188,026 | Wiley | Jan. 23, 1940 |
| 2,315,211 | Kost | Mar. 30, 1943 |